(12) United States Patent
Huang et al.

(10) Patent No.: US 11,665,077 B2
(45) Date of Patent: May 30, 2023

(54) NETWORK DEVICE, SPEED TEST METHOD THEREFOR AND SPEED TEST SYSTEM

(71) Applicant: ZYXEL COMMUNICATIONS CORPORATION, New Taipei (TW)

(72) Inventors: Li-Tsung Huang, Hsinchu County (TW); Tse-Ming Chang, Hsinchu County (TW)

(73) Assignee: ZYXEL COMMUNICATIONS CORPORATION, New Taipei (TW)

( * ) Notice: Subject to any disclaimer, the term of this patent is extended or adjusted under 35 U.S.C. 154(b) by 0 days.

(21) Appl. No.: 17/138,809

(22) Filed: Dec. 30, 2020

(65) Prior Publication Data

US 2021/0211367 A1 Jul. 8, 2021

Related U.S. Application Data

(60) Provisional application No. 62/957,501, filed on Jan. 6, 2020.

(51) Int. Cl.
*H04L 43/0888* (2022.01)
*H04L 67/025* (2022.01)
*H04L 43/10* (2022.01)

(52) U.S. Cl.
CPC .......... *H04L 43/0888* (2013.01); *H04L 43/10* (2013.01); *H04L 67/025* (2013.01)

(58) Field of Classification Search
CPC .... H04L 43/0888; H04L 43/10; H04L 67/025
USPC ........................................................ 709/224
See application file for complete search history.

(56) References Cited

U.S. PATENT DOCUMENTS

| | | | |
|---|---|---|---|
| 9,037,699 B1* | 5/2015 | Bordner-Babayigit | H04L 25/0262 709/224 |
| 2015/0180963 A1* | 6/2015 | Luecke | H04L 45/124 709/203 |
| 2015/0288589 A1* | 10/2015 | Radford | H04L 43/12 370/252 |
| 2016/0080241 A1* | 3/2016 | Rocha De Maria | H04L 43/16 370/252 |
| 2019/0068497 A1* | 2/2019 | Tamura | H04L 45/74 |
| 2019/0230012 A1* | 7/2019 | Azizullah | H04L 43/50 |
| 2021/0105202 A1* | 4/2021 | Sriram | H04L 61/1511 |

* cited by examiner

*Primary Examiner* — Meng Vang
(74) *Attorney, Agent, or Firm* — Li & Cai Intellectual Property Office

(57) ABSTRACT

A network device, a speed test method and a system thereof are provided. The system provides a speed test server that allows the network device to initiate a speed test by issuing a test request with information of a bandwidth at an end of the network device to the speed test server. In an aspect, the system also provides a dispatch server that selects one available speed test server for performing the speed test method. In the speed test method, the speed test server transmits test packets with a first identifier to the network device and the network device calculates a downstream transmission rate based on the received test packets. The network device transmits test packets with a second identifier to the speed test server, and the speed test server calculates an upstream transmission rate based on the received test packets.

25 Claims, 3 Drawing Sheets

NETWORK DEVICE, SPEED TEST METHOD THEREFOR AND SPEED TEST SYSTEM

CROSS-REFERENCE TO RELATED PATENT APPLICATION

This application claims priority from the U.S. Provisional Patent Application Ser. No. 62/957,501 filed on Jan. 6, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a speed test service for a network device, and more particularly to a speed test method that allows the network device to perform a speed test through a server that constitutes a speed test system.

BACKGROUND OF THE DISCLOSURE

A telecommunication service provider provides subscribers with access to the Internet with a specific bandwidth (data rate/line rate) of the network. The subscribers can test if the bandwidth provided by the telecommunication service provider meets a committed bandwidth. In general, the subscribers can use their personal computers to run a speed test via a webpage. For example, Ooakla® provides a testing website for the subscribers to test a network bandwidth (data rate/line rate). However, since the data generated by the testing website cannot be recognized by the telecommunication service provider, the telecommunication service provider cannot instantly respond to problems with the network.

A conventional method is known in which a router may perform a speed test application by downloading data generated from a specific server to measure the network bandwidth. The speed test application can be a software tool, such as wget, BusyBox utility, or the like.

Although a SoC (System on Chip) used in the router with a hardware accelerator can forward packets in a line rate, the packet processing capability of the processor, such as a CPU (central processing unit), inside the SoC may still not be powerful enough due to the processor being generally designed to process more complicated tasks than those of a hardware accelerator. For example, the processor of the SoC needs to process the packets in various application layers, e.g., HyperText Transfer Protocol (HTTP) or File Transfer Protocol (FTP). The HTTP or FTP packets should be handled through a full set of network stacks, and then be forwarded to a user-end application for further processing.

Therefore, the conventional speed test method performed through HTTP or FTP packets cannot meet requirements for testing large bandwidths, e.g., greater than 400 Mbps, not to mention that many legacy CPU (central processing unit) platforms may only obtain the speed test results below 100 Mbps. Further, an outcome of the speed test may be inaccurate if the speed test is performed in the conventional router while the router is also busy operating other applications at the same time.

For a conventional speed test server that is generally used by a telecommunication service provider, the location of the speed test server should be set up via TR-143 protocol for running the speed test. It is difficult to determine whether or not the setting is repeated during the setting process, and the repeated settings will increase the complexity of the speed test process. Besides, the conventional speed test should be operated by a specific person who holds the information of the speed test server, or else the test result may be inaccurate when the setting made for the speed test server is improperly repeated.

Further, it is possible for the telecommunication service provider to expand the speed test servers or adjust the locations of the speed test servers for management purposes. However, the subscribers cannot obtain information relating to any change of the speed test servers. Therefore, it is difficult for the subscribers to run the speed test by themselves, considering that the above-mentioned deficiencies increase difficulty for the subscribers to set up the speed test servers. For this reason, the subscribers of the telecommunication service can easily encounter problems since the setting may be repeated.

SUMMARY OF THE DISCLOSURE

In response to the above-referenced technical inadequacies, the present disclosure provides a speed test method, a speed test system and a network device for implementing the method.

In an aspect of the present disclosure, the speed test system provides a speed test server. In the system, a network device is connected with the speed test server via a network, and the network device initiates a speed test by issuing a test request to the speed test server and receives a test response from the speed test server. The test request may include information with a bandwidth of the network device.

The speed test method is then performed when the network device initiates a speed test. In the method, the speed test server transmits test packets with a first identifier to the network device for a first duration. The network device then calculates a downstream transmission rate according to the test packets. Further, the network device also transmits test packets with a second identifier to the speed test server for a second duration. Through a program performed in the speed test server, the speed test server calculates an upstream transmission rate according to the test packets.

In one aspect of the disclosure, the test packets with the first identifier are generated by the speed test server based on the bandwidth. The system may also provide a dispatch server that selects one available speed test server as the speed test server and provide an IP address of the speed test server to the network device.

In one further aspect, the available speed test server selected by the dispatch server can be one of the servers in a cluster.

The system also provides an auto-configuration server that initiates speed test when an initiation signal is generated by the auto-configuration server to enable the network device to issue the test request.

In the network device, the calculation of downstream transmission rate can be completed in a kernel of an operating system of the network device. Further, once the upstream transmission rate is calculated in the speed test server, the network device can obtain the test result from the speed test server.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
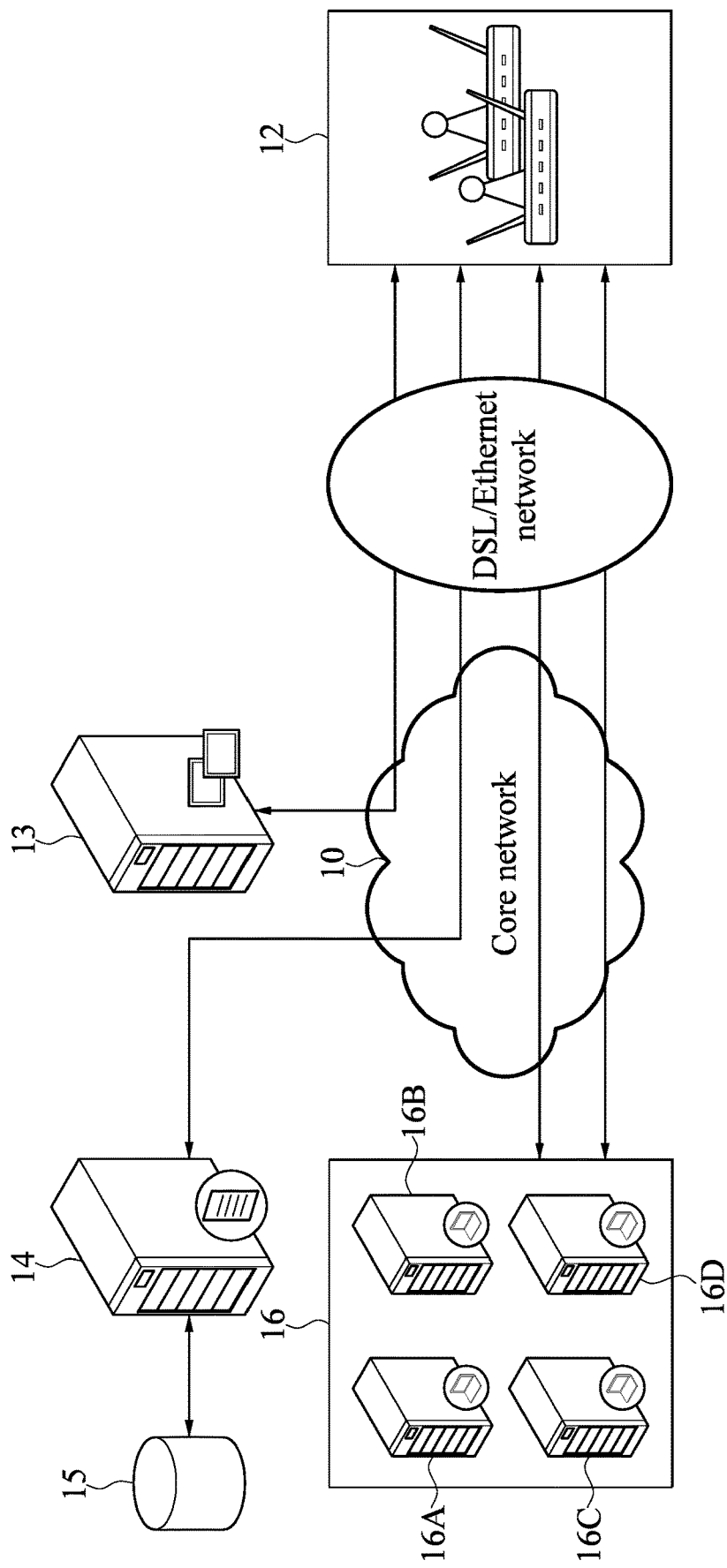
FIG. 1 is a schematic diagram depicting a system framework of a speed test system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a speed test system and a speed test method that is performed by a speed test system including a speed test server and a network device (e.g., customer premises equipment (CPE), a router, a gateway, a modem or the like) at the site of a subscriber. According to one aspect of the disclosure, in the speed test method, there is generally a distributed UDP (User Datagram Protocol) load balancing network speed test mechanism that allows a dispatch server of the system to find an available speed test server by a querying process to perform the speed test method. By the speed test method, the network stacks required by an operating system in a gateway or a router for processing the network packets can be reduced by collecting the network speed test packets with predefined Magic IDs during the process of the speed test. Further, the CPU overheads in the network device can be greatly reduced when the speed test is performed since the speed test is performed at a kernel layer of the operating system. Therefore, the transmission rate specified in a service profile provided by a telecommunication service provider can be accurately measured.

In general, the speed test method is performed based on upstream test packets and downstream test packets for testing the upstream transmission rate and the downstream transmission rate, respectively. The test packets can be transmitted and received via UDP. Since a conventional network device may not be operated over a data rate committed by a telecommunication service provider due to certain limitations such as the capability of CPU of the router or the like, the speed test method provides a solution for a user, i.e., a subscriber of a telecommunication server provider, to obtain an actual data rate. Reference is made to FIG. 1, which depicts an aspect in which a dispatch server determines a speed test server to handle a speed test request from a network device. It should be noted that, in an exemplary example, the data rate committed by the telecommunication server provider can be the downstream/upstream line rate (i.e., bandwidth committed by the telecommunication server provider) that is reported by a network device at the site of the subscriber.

FIG. 1 is a schematic diagram depicting a system framework of the speed test system according to one embodiment of the disclosure.

In the system, a dispatch server 14 with a database 15 is provided for dispatching one of the servers (16A, 16B, 16C or 16D) in a speed test cluster 16 as a speed test server that manages the entire test process. The database 15 stores the test results that can be provided to the end users for query.

For example, a network device 12 issues a speed test request in order to initiate the speed test process. The network device 12 sends a query to a dispatch server 14 for selecting an available speed test server (i.e., 16A, 16B, 16C or 16D) before the speed test process. When the dispatch server 14 selects one of the servers (16A, 16B, 16C and 16D) as the speed test server to perform the speed test method, the dispatch server 14 replies an IP address of the selected speed test server to the network device 12. The network device 12 connects with the selected speed test server (i.e., 16A, 16B, 16C or 16D) according to the IP address, and then exchanges requisite information with the speed test server.

The speed test system of the disclosure generally uses one of the speed test servers (16A, 16B, 16C and 16D) in the speed test cluster 16 to perform the speed test method with the network device 12 at the site of the subscriber via the core network 10 and DSL/Ethernet network. When any party wants to test the network speed that is a bandwidth committed by a telecommunication service provider, the network device 12 is enabled to initiate a speed test process with one of the speed test servers. It should be noted that the network device 12 can be any type of a user device that can be operated by the subscriber. More specifically, the speed test process includes a downstream speed test that is proceeding from the speed test server (i.e., 16A, 16B, 16C or 16D) to the network device 12 and an upstream speed test that is proceeding from the network device 12 to the speed test server. After the test results are generated, the test results are updated to a data model of the network device 12. In some embodiments, the test results are also provided to the dispatch server 14 (i.e., stored to the database 15) after the speed test process is completed.

In some embodiments, an ACS (auto-configuration server) 13 can read the test results from the network device 12 via a specific protocol such as HTTP or FTP. Further, in some other embodiments, the ACS 13 may be used to transmit commands to the network device 12, for example, to issue an initiation signal to the network device 12 and enable the network device 12 to initiate the speed test process. This process will be further described with respect to FIG. 3.

It should be noted that in some embodiments, the speed test may be processed without the dispatch server 14. In some other embodiments, the speed test may be processed without the ACS 13. In some other embodiments, the speed test may be processed without both the dispatch server 14 and the ACS 13.

Figure 2:
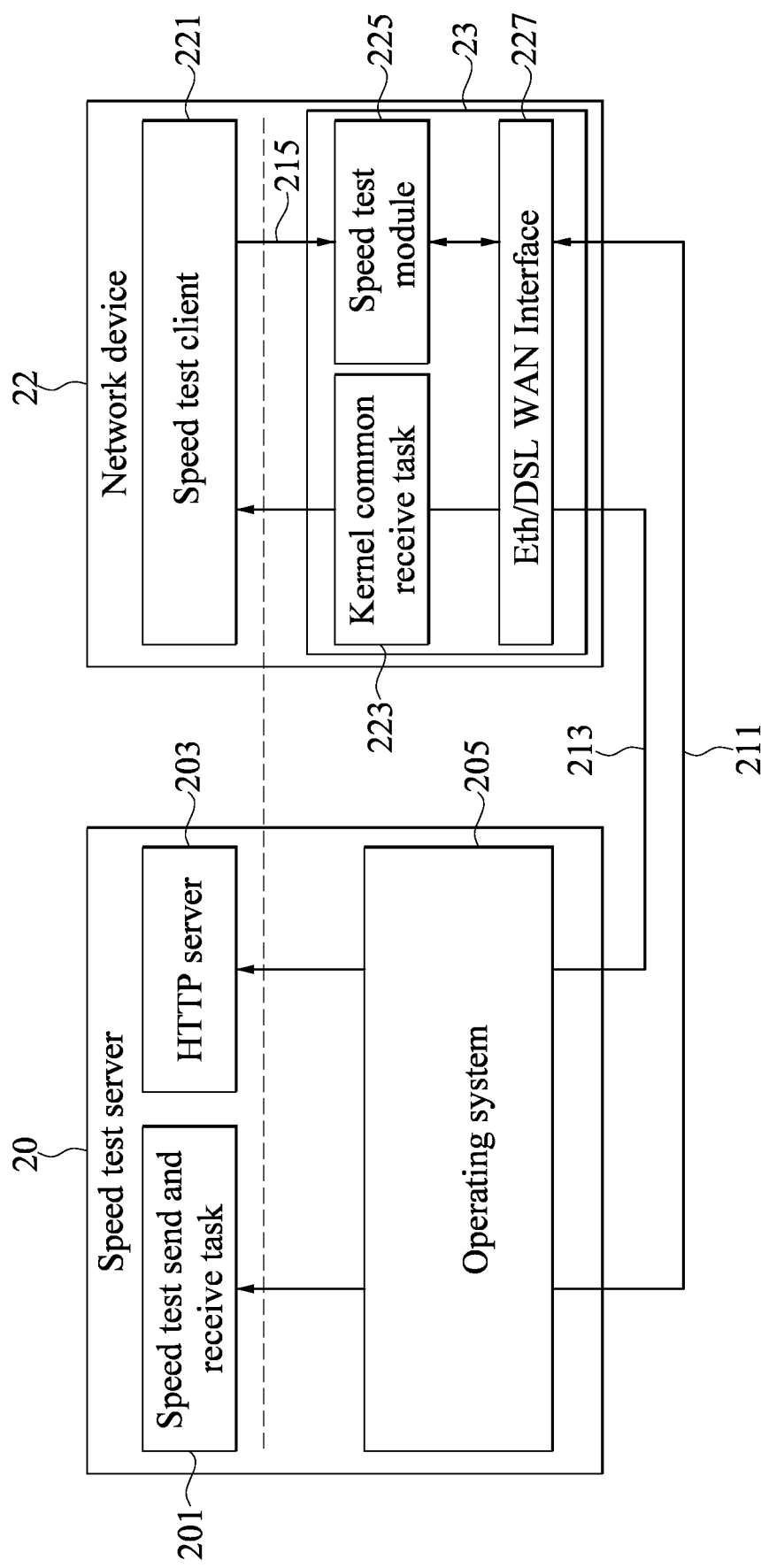
FIG. 2 is a schematic diagram depicting data flow between a speed test server and a network device according one embodiment of the present disclosure.

FIG. 2 is a software schematic diagram depicting data flow between the speed test server and the network device according one embodiment of the disclosure.

A network device 22 shown in the diagram at least includes a speed test client 221 that is an upper layer of the system of the network device 22 and operating system 23 that is a lower layer of the system. In the operating system 23, a Kernel common receive task 223, a speed test module 225 and an Eth/DSL WAN Interface 227, which is a communication interface, are included. The speed test module 225 is an independent kernel module that processes the speed test packets that are transmitted and received during the speed test process. The speed test packets can be generated by the speed test server when operating the downstream speed test, or generated by the speed test module 225 of the network device 22 when operating the upstream speed test. The speed test packets are UDP packets, and they are generally identified by a Magic ID in the UDP payload.

It should be noted that the speed test packets are processed in a speed test module 225 without entering a common receive procedure, i.e. the Kernel common task 223, in the kernel space, and the speed test module 225 determines whether the received packets are speed test packets according to the Magic ID in the UDP payload.

Before the speed test process is in operation, the network device 22 uses a program in the upper layer to exchange information with the speed test server 20 via HTTP. The system of the network device 22 communicates with the speed test module 225 via an application programming interface (API), which is indicated as 215 in FIG. 2, for the transmission and reception of the speed test packets. In the speed test server 20, a proprietary software program, i.e. the speed test send and receive task 201 that processes the speed test process with the network device 22, a HTTP server 203 and an operating system 205 are provided. The speed test send and receive task 201 is used to identify the Magic ID of the speed test packets.

The speed test send and receive task 201 determines the transmission rate of test packets for the downstream speed test. Preferably, the transmission rate of test packets is slightly greater than the downstream transmission rate reported by the network device 22. The downstream transmission rate is considered as a limitation of the transmitted traffic, and accordingly the speed test process will not cause network overhead of the telecommunication service provider.

Further, when the upstream speed test is performed, the speed test send and receive task 201 of the speed test server 20 calculates the received test packets and stores the test result, for example, to a specific memory of the speed test server 20. After the upstream speed test, the upstream test result report carried in a response of HTTP(s) GET message can be sent to the network device 22.

In the network device 22, the speed test process is initiated by issuing a test request to the speed test server 20 according to an IP address of the speed test server 20. During the downstream speed test, the network device 22 receives downstream test packets from the speed test server 20 via the communication interface 227.

When the upstream speed test is performed, the speed test server 20 receives the upstream test packets from the network device 22. The speed test server 20 calculates the upstream transmission rate based on the received test packets by a speed test send and receive task 201. The test result including the upstream transmission rate is then generated and stored to the speed test server 20. Further, a report comprising the upstream test result is generated and transmitted to the network device 22 by a response message of the HTTP(s) (hypertext transfer protocol) GET message that is formed by the HTTP server 203 in the speed test server 20, which is indicated by the data flow 213 in the diagram. In some embodiments, the test results are also updated to a data model of the network device 22. The test traffic during the speed tests along both the downstream and upstream directions, are as indicated by data flows 211 in the diagram. The speed tests may be performed for a predetermined time interval, for example, 10 seconds.

In some embodiments, the test results can be replied to the dispatch server 14 in FIG. 1 and updated to the database 15 if the speed test server is selected by the dispatch server 14 as illustrated in FIG. 1. In some embodiments, the test results updated to the data model of the network device 22 can be read by the ACS 13 in FIG. 1. In some other embodiments, the speed test may be initiated by the ACS 13 by transmitting commands to the network device 12 in FIG. 1, which may further be described with respect to FIG. 3.

In an aspect of the disclosure, the network device 22 at the site of the subscriber firstly receives a speed test initiation signal from, for example, an ACS. The speed test initiation signal may include an address of a dispatch server or a speed test server. If the provided address is an address of a dispatch server, the dispatch server may select a speed test server from many servers in a speed test cluster for performing the speed test and send information of the selected speed test server to the network device. As mentioned above, the information sent by the dispatch server includes the IP address of the selected speed test server. The network device then issues a test request to the speed test server according to the IP address and exchanges information required to perform the speed test with the speed test server.

Afterwards, the network device receives downstream test packets with a first identifier (e.g., a predefined Magic ID) from the speed test server. The downstream test packets act as the test packets generated by a proprietary software program executed in the speed test server. The test may take a period of time, i.e., a first duration, for example, the downstream test may be performed for 10 seconds. The network device then calculates a downstream transmission rate according to the downstream test packets sent by the speed test server.

Next, the network device generates upstream test packets with a second identifier (e.g., a predefined Magic ID) that acts as the test packets to be transmitted to the speed test server according to the address of the server. Similarly, the speed test also lasts for a period of time, i.e., a second duration, for example, the upstream test may be performed for 10 seconds. In the speed test server, an upstream transmission rate can be calculated according to the upstream test packets sent by the network device. The network device then receives the upstream transmission rate from the speed test server. In an aspect of the disclosure, the test results including the downstream transmission rate and the upstream transmission rate are transmitted to ACS.

Figure 3:
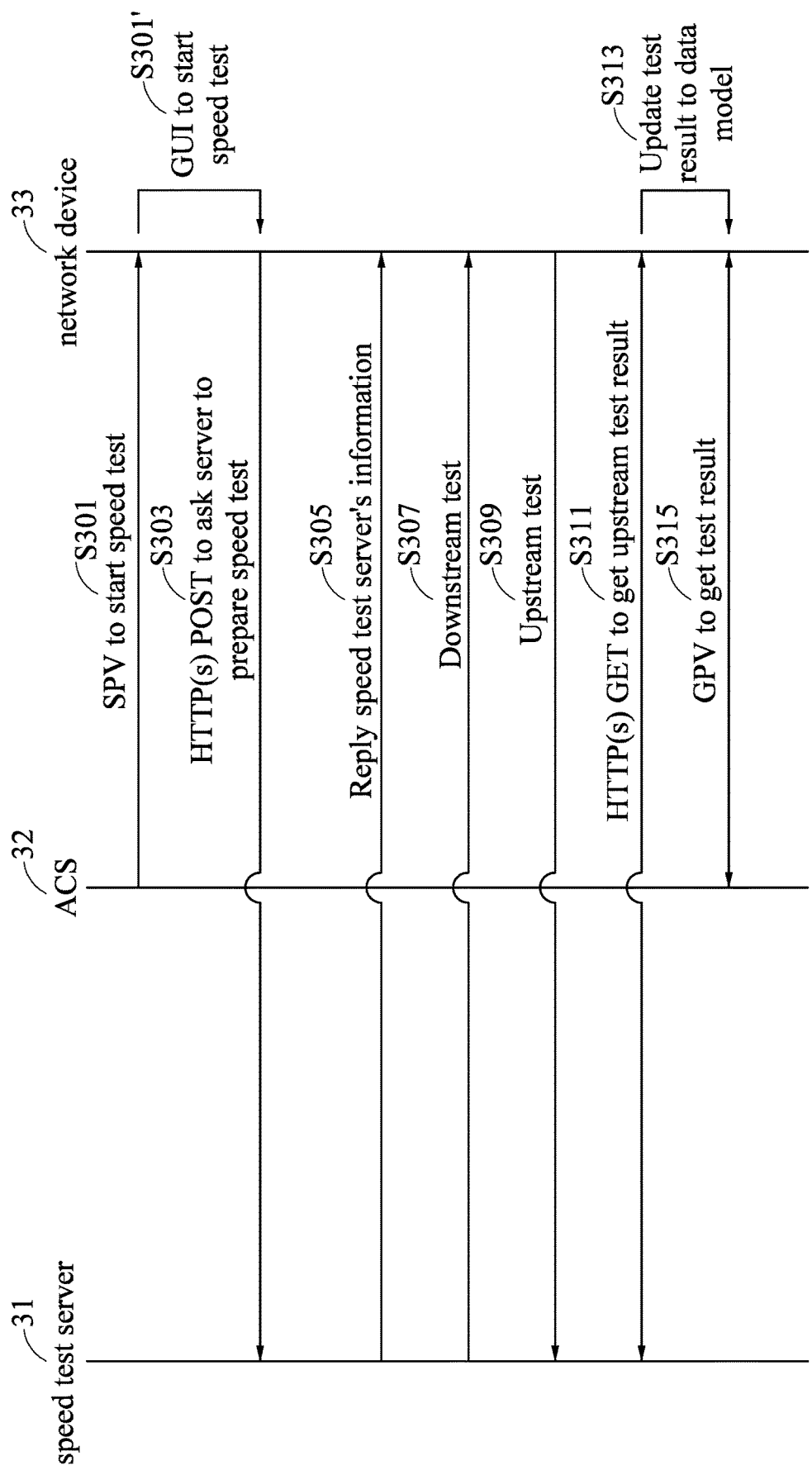
FIG. 3 shows a further flow chart which describes the method for the speed test in a speed test system according to one further embodiment of the present disclosure.

FIG. 3 shows a further flow chart which describes the method for speed test in a speed test system according to one further embodiment of the disclosure.

According to the present embodiment of the disclosure, the speed test system includes a speed test server 31, ACS 32 and a network device at the site of the subscriber, e.g., the network device 33. In one aspect of the disclosure, such as in step S301, ACS 32 initiates a speed test process by issuing an initiation signal, for example, SPV (Set Parameter Value) message, to the network device 33. Alternatively, such as in step S301', the speed test process can also be initiated through a web GUI when the subscriber uses his personal computer to run the speed test via a webpage. After receiving the initiation signal, the network device 33 is enabled to issue a test request, such that the speed test is initiated and a connection to a speed test server 31 is established for preparing a request of the speed test (step S303). For example, a speed test client in the network device 33 is used to exchange information with the speed test server 31 via HTTP(s) POST message that requests the speed test server 31 to prepare the speed test. Further, the speed test server 31 can respond to the network device 33 about success or failure information carried by HTTP(s) message to the network device 33. The success or failure information specifically indicates whether or not the subsequent speed test can be performed. Furthermore, the information replied to the network device 33 from the speed test server 31 includes an IP address and a UDP port number of the speed test server 31, and indicates whether or not the connection is established successfully.

As mentioned above, the network device 33 initiates a speed test process via a connection request from ACS 32 (step S301), or through a web GUI of the network device 33 (step S301'). In particular, the test request issued by the network device 33 includes information that includes a bandwidth of the network device, especially the bandwidth committed by a telecommunication service provider. The speed test server 31 responds to this request with the information about the speed test server 31 (step S305).

After that, when the information exchanged between the speed test server 31 and the network device 33 indicates that the connection is established successfully in step S305, the speed test server 31 initiates a downstream speed test by transmitting downstream test packets to the network device 33 (step S307). The downstream test packets that act as the test packets having a first identifier are generated by the speed test server 31 based on the bandwidth reported by the network device 33. The network device 33 then calculates a downstream transmission rate according to the test packets and a test time (i.e., the first duration).

In step S309, the network device 33 initiates an upstream speed test by transmitting upstream test packets to the speed test server 31. Similarly, the upstream test packets act as the test packets having a second identifier. The speed test server 31 then calculates an upstream transmission rate according to the received test packets and a test time (i.e., the second duration). It should be noted that the test packets are UDP packets in one of the embodiments. It should be noted that the first identifier can be different from the second identifier, but in some applications, the first identifier can be the same as the second identifier. It should be noted that the first duration can be different from the second duration, but in some applications, the first duration can be the same as the second duration.

The network device 33 can therefore receive the upstream test result including the upstream transmission rate from the speed test server 31 (step S311). The data model of the network device 33 can be updated based on the latest test result (step S313). Then, the test results including the upstream transmission rate and the downstream transmission rate will be sent to the ACS 32 (step S315).

Further, the ACS 32 obtains the test results from the network device 33 if the speed test process is originally initiated by the ACS 32, and generates the initiation signal to enable the network device 33 to issue the test request.

In step S313, the data model of the network device 33 can be updated if both the downstream and upstream test results are successfully generated. In one aspect, the test result can be shown on a web GUI if the speed test is initiated through the web GUI. In another aspect of the disclosure, the ACS 32 can obtain the test result via GPV (Get Parameter Value) message if the ACS 32 initiates the speed test process.

It should be noted that the bandwidth reported by the network device 33 in the step S307 is used to prevent congesting the network by sending too many speed test packets. For example, the duration of the downstream speed test can be set to 10 seconds. During the downstream speed test, the network device 33 instantly calculates the downstream transmission rate when receiving the speed test packets. After waiting for the duration of 10 seconds in the downstream speed test process, the network device 33 specifies the IP address, the UDP port number, and the MAC address of the speed test server 31, and a size of the speed test packets to the speed test module of the network device 33 via API. Then, the speed test module starts the upstream speed test process and runs the speed test for another 10 seconds. When the upstream speed test is completed, the network device 33 queries the test result via a HTTP(s) GET message.

In summation, the above-described embodiments are provided for describing the speed test method and system of the present disclosure. The speed test method is performed based on the upstream and downstream test packets (i.e., the test packets) that are transmitted and received via UDP sessions between the network device, e.g., a CPE, a router, a gateway, a modem or the like, and the speed test server that can be selected from one of the servers in a cluster. In particular, a single entry is provided for polling a dispatch server, and the tasks of speed tests are substantially distributed to available speed test servers that are able to perform speed tests for multiple entries. Therefore, the stability of a test result can be increased since the speed test can be easily performed and the repeated setting can be reduced. When the UDP is used for sending the speed test packets, no waiting time will be required for an ACK response. Further, the speed test method is generally based on determination of the speed test packets with a predefined Magic ID in the UDP payload, and therefore the transmitted data can be close to an actual bandwidth. On the other hand, since the received data is calculated in the kernel and the checksum mechanism of the received data is omitted, the speed test result is able to approach the actual bandwidth.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A speed test method, comprising:
   issuing a test request, in response to initiating a speed test, to a speed test server from a network device;
   transmitting a test response to the network device from the speed test server;
   transmitting first test packets to the network device from the speed test server for a first duration, wherein the first test packets are user datagram protocol (UDP) packets, each of the first test packets comprises a first UDP payload, and the first UDP payload of each of the first test packets comprises a first identifier which indicates that the corresponding first test packet acts as a downstream test packet and the first identifier is only appended to the downstream test packet after the speed test is initiated; and
   in response to determining that the first test packets are downstream test packets according to the first identifier of the first test packets, calculating a downstream transmission rate according to the first test packets received by the network device;
   wherein the speed test is initiated by an auto-configuration server, and an initiation signal is generated by the auto-configuration server to enable the network device to issue the test request.

2. The method according to claim 1, further comprising:
   transmitting second test packets to the speed test server from the network device for a second duration, wherein the second test packets are UDP packets, each of the second test packets comprises a second UDP payload, and the second UDP payload of each of the second test packets comprises a second identifier which indicates that the corresponding second test packet acts as an upstream test packet and the second identifier is only appended to the upstream test packet after the speed test is initiated; and
   through a program performed in the speed test server, in response to determining that the second test packets are upstream test packets according to the second identifier of the second test packets, calculating an upstream transmission rate according to the second test packets received by the speed test server.

3. The method according to claim 2, wherein, after the upstream transmission rate is calculated in the speed test server, the network device receives an upstream test result including the upstream transmission rate from the speed test server.

4. The method according to claim 3, wherein the network device receives the upstream transmission rate from the speed test server via a hypertext transfer protocol.

5. The method according to claim 3, wherein an auto-configuration server receives a test result from the network device, and wherein the test result includes the upstream transmission rate and the downstream transmission rate.

6. The method according to claim 1, wherein the test request includes information that comprises a bandwidth of the network device, and the first test packets comprising the first identifier are generated by the speed test server based on the bandwidth.

7. The method according to claim 1, wherein the test response comprises a success or failure information, and a user datagram protocol (UDP) port of the test server.

8. The method according to claim 1, wherein the speed test server for performing the speed test is determined by a dispatch server.

9. The method according to claim 1, wherein the network device transmits the test request to the speed test server via a hypertext transfer protocol.

10. The method according to claim 1, wherein the calculation of the downstream transmission rate is performed in a kernel module of an operating system of the network device.

11. A network device, comprising:
    a processor and a memory;
    wherein the network device issues a test request, in response to initiating a speed test, to a speed test server, and receives a test response from the speed test server, and wherein, in response to receiving the test response, the network device performs the following steps:
    receiving first test packets from the speed test server for a first duration, wherein the first test packets are user datagram protocol (UDP) packets, each of the first test packets comprises a first UDP payload, and the first UDP payload of each of the first test packets comprises a first identifier which indicates that the corresponding first test packet acts as a downstream test packet and the first identifier is only appended to the downstream test packet after the speed test is initiated;
    in response to determining that the first test packets are downstream test packets according to the first identifier of the first test packets, calculating a downstream transmission rate according to the first test packets received by the network device;
    transmitting second test packets to the speed test server for a second duration according to an IP address of the speed test server, wherein the second test packets are UDP packets, each of the second test packets comprises a second UDP payload, and the second UDP payload of each of the second test packets comprises a second identifier which indicates that the corresponding second test packet acts as an upstream test packet and the second identifier is only appended to the upstream test packet after the speed test is initiated; and
    obtaining an upstream transmission rate from the speed test server, wherein the upstream transmission rate is calculated through a program performed in the speed test server according to the second test packets received by the speed test server;
    wherein the speed test is initiated by an auto-configuration server, and an initiation signal is generated by the auto-configuration server to enable the network device to issue the test request.

12. The network device according to claim 11, wherein the test request includes information that comprises a bandwidth of the network device, and the first test packets comprising the first identifier are generated by the speed test server based on the bandwidth.

13. The network device according to claim 11, wherein the test response comprises a success or failure information, and a UDP port of the test server.

14. The network device according to claim 11, wherein the speed test server for performing the speed test is determined by a dispatch server.

15. The network device according to claim 11, wherein the network device transmits the test request and receives the upstream transmission rate from the speed test server via a hypertext transfer protocol.

16. The network device according to claim 11, wherein the calculation of the downstream transmission rate is completed in a kernel module of an operating system of the network device.

17. The network device according to claim 11, wherein an auto-configuration server receives a test result from the network device, and wherein the test result includes the upstream transmission rate and the downstream transmission rate.

18. A speed test system, comprising:
a speed test server; and
a network device connected with the speed test server via a network;
wherein the network device issues a test request, in response to initiating a speed test, to the speed test server, and receives a test response from the speed test server, and wherein, in response to receiving the test response, the network device performs the following steps:
   transmitting first test packets to the network device from the speed test server for a first duration, wherein the first test packets are user datagram protocol (UDP) packets, each of the first test packets comprises a first UDP payload, and the first UDP payload of each of the first test packets comprises a first identifier which indicates that the corresponding first test packet acts as a downstream test packet and the first identifier is only appended to the downstream test packet after the speed test is initiated;
   in response to determining that the first test packets are downstream test packets according to the first identifier of the first test packets, calculating a downstream transmission rate according to the first test packets received by the network device;
   transmitting second test packets to the speed test server from the network device for a second duration, wherein the second test packets are UDP packets, each of the second test packets comprises a second UDP payload, and the second UDP payload of each of the second test packets comprises a second identifier which indicates that the corresponding second test packet acts as an upstream test packet and the second identifier is only appended to the upstream test packet after the speed test is initiated; and
   through a program performed in the speed test server, in response to determining that the second test packets are upstream test packets according to the second identifier of the second test packets, calculating an upstream transmission rate according to the second test packets received by the speed test server;
wherein the speed test is initiated by an auto-configuration server, and an initiation signal is generated by the auto-configuration server to enable the network device to issue the test request.

19. The system according to claim 18, wherein the test request includes information that comprises a bandwidth of the network device, and the first test packets comprising the first identifier are generated by the speed test server based on the bandwidth.

20. The system according to claim 18, wherein the test response comprises a success or failure information, and a UDP port of the test server.

21. The system according to claim 18, further comprising a dispatch server that determines the speed test server for performing the speed test and provides an IP address of the speed test server to the network device.

22. The system according to claim 18, wherein the network device transmits the test request and receives the upstream transmission rate from the speed test server via a hypertext transfer protocol that is operated by a HyperText Transfer Protocol (HTTP) server of the speed test server.

23. The system according to claim 18, wherein the calculation of the downstream transmission rate is completed in a kernel module of an operating system of the network device.

24. The system according to claim 18, wherein, after the upstream transmission rate is calculated in the speed test server, the network device receives an upstream test result including the upstream transmission rate from the speed test server.

25. The system according to claim 24, further comprising an auto-configuration server that receives a test result from the network device, and wherein the test result includes the upstream transmission rate and the downstream transmission rate.

* * * * *